Figure 1:
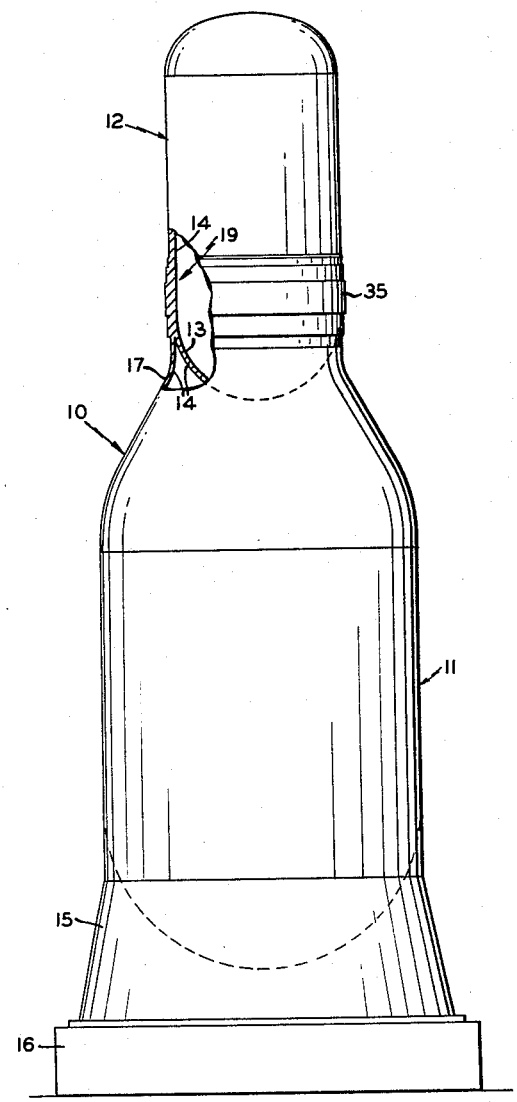

Nov. 29, 1960   D. B. ROSSHEIM   2,962,182
METHOD FOR FABRICATING VESSELS
Original Filed March 29, 1956

INVENTOR.
DAVID B. ROSSHEIM
BY
*G. H. Palmer*
*V. F. Davies*
ATTORNEYS

United States Patent Office 2,962,182
Patented Nov. 29, 1960

2,962,182

METHOD FOR FABRICATING VESSELS

David B. Rossheim, Keyport, N.J., assignor to The M. W. Kellogg Company, New York, N.Y., a corporation of Delaware Original application Mar. 29, 1956, Ser. No. 574,706, now Patent No. 2,901,592, dated Aug. 25, 1959. Divided and this application Nov. 24, 1958, Ser. No. 775,977

3 Claims. (Cl. 220—3)

This invention relates in general to the fabricating of pressure vessels by welding and particularly to the fabrication of pressure vessels intended for use under extreme service conditions. This application is a division of my application Serial No. 574,706, filed March 29, 1956, now Patent No. 2,901,592, granted August 25, 1959.

For the purposes of conserving plant space, minimizing heat losses and reducing vessel costs, it has been proposed to form compound vessels which include a lower vessel upon which is formed an upper vessel, which may be larger or smaller than the lower vessel. The upper and lower vessels are separated by and share a common head. In the fabrication of such vessels it is necessary to unite three sections, the walls of the upper vessel, the walls of the lower vessel and the common head, all of which are defined by surfaces of revolution. The forming of the joint between the three sections presents a serious problem. If the sections are united by a single weld deposited in the conventional manner, the uniting weld metal necessarily occurs at the intersection of the three sections where discontinuity effects are a maximum. Adequate quality of the intersection is increasingly difficult to attain where high pressure, high temperature operations are involved, and the problem is rendered exceedingly acute by changing temperature and attendant transient gradients along each section joined. The weld uniting the three sections is generally required by the pertinent codes to be a close (shrink) fit for reasonable control of the root contour and cannot be welded from both sides. Hence, there results a weld root section which cannot be cleaned, as by chipping, and whose quality cannot be determined; furthermore, since the root section is at the end of a crotch formed by the common head and the section of the lower vessel, radiographic examination cannot be accurately interpreted. Furthermore, the crotch at the weld root is always a source of danger since under stresses tending to separate the crotch forming members, the crotch will serve as a rupture initiator at a location of concentrated stress flow. In service and the auxiliary operations of starting up and shutting down, there are unavoidable substantial temperature differences between the connected sections with attendant stress variations which act on the uniting weld of the sections and ultimately cause destruction due to fatigue at the point of high local stress intensification such as at the root of the common uniting weld. The common juncture is not improved if two welds are substituted, since each of these welds individually involves the same blind root condition and additional stress is imposed if local temperature variation occurs in the lapped portions.

The uniting weld closing the crotch, whether the only weld or one of several welds, always presents a root problem as to adequate fitup, inspection, cleaning of the area adjacent the weld root, and proper and complete penetration at the weld root because the root or crotch area is not accessible and cannot be indestructively assessed. The problems produced by these conditions are all exaggerated in installations such as in units for the catalytic treating of hydrocarbons in which temperatures of 1000° F. and more, and pressures of 300 pounds and more, are employed and the vessel size in the region of the separating head is 20' and more.

I have found a simple and efficient way of providing an intersection which makes it possible to realize the full potential strength of the two connected vessels.

In accordance with the invention, a transition piece of generally Y-shaped cross-section is formed by a suitable shaping operation such as forging, machining, etc. The body section of said transition piece as well as the three branches thereof are made of sufficient thickness and contour for favorable distribution of the pressure stresses and thermal stresses involved. The branches extend from the base of the transition piece so as to provide a predetermined crotch condition which is not subsequently changed or affected deleteriously by the welding of the branches of the transition piece to the vessel components. Also, the branches extend far enough from the body section of the transition piece that at least two of them may be welded to the respective vessel components from both sides and back chipped and inspected in the conventional way and the remaining branch extends sufficiently from the crotch of the transition piece that while weldable from one side only, space is provided for the introduction of X-ray casettes so that it can be inspected with full effectiveness by radiography since exposure through an additional extraneous metal thickness is avoided. Similarly the separation facilitates interpretable magnetic powder or sonic inspection.

It is a principal object of this invention to provide a method for fabricating pressure vessels which include three interconnected sections defined by surfaces of revolution, which method is simple and straight forward and provides a joint interconnecting the three sections which is fully inspectable, and fully susceptible to quality control and is devoid of stress concentrating sections, stress raisers, etc., and locates welds away from where high stresses are encountered. It is also a principal object of this invention to provide a method for fabricating a pressure vessel which includes three interconnected sections defined by surfaces of revolution, which method is simple and easy to practice and provides a joint interconnecting the sections which includes welds of completely controllable and predictable character favorably located with respect to stress magnitude and distribution and a crotch of pre-established form and condition and which is not altered or affected by the necessary welding operations.

Figure 2:
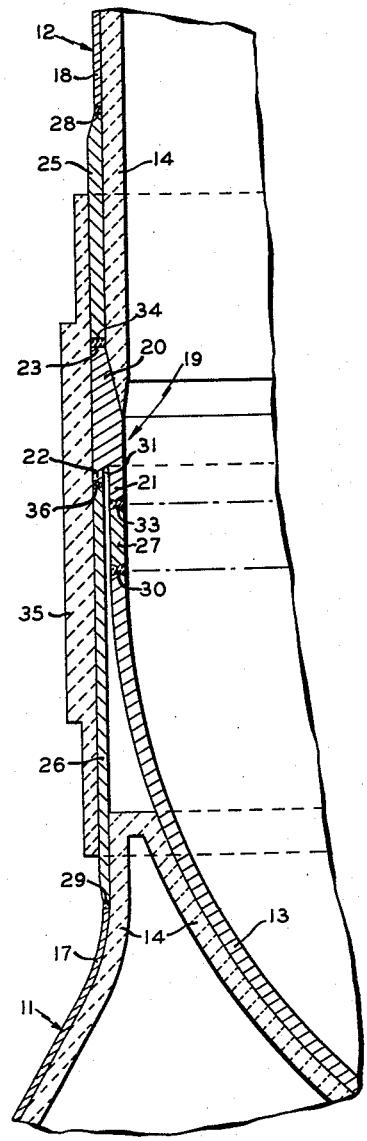

Further features, objects, and advantages of the invention will be apparent from a consideration of the following description thereof taken with the accompanying drawings in which:

Fig. 1 is an elevation view of a vessel fabricated in accordance with the novel method of the invention; and Fig. 2 is an enlarged fragmentary view showing details of the vessel of Fig. 1 in enlarged scale.

The invention is of general application and may be used wherever it is required to interconnect three sections defined by surfaces of revolution by means of a joint which is of predictable quality capable of developing the full static and fatigue strength of the attached shells and all portions thereof may be inspected easily with full interpretability by conventional methods such as X-ray, magnaflux, etc. The invention however, is of special value in connection with the fabrication of the pressure vessels used in the petroleum refinery and chemical arts and especially multiple vessels which provide process or operating advantages by integration in an assembly, with separation into separate vessels by common intermediate heads. For the purposes of this disclosure, the invention will be applied to the fabrication of a vessel employed in the catalytic treatment of hydrocarbons.

Referring to the drawings, the vessel 10 of Fig. 1 is a catalytic reactor-regenerator in which a fluidized bed of solid subdivided catalyst is employed to act upon hydrocarbons to produce a desired end product. By way of example, the larger vessel 11 forming the bottom section of the vessel 10 is approximately 60 feet long and is of a diameter of approximately 40 feet. The smaller vessel 12 forming the upper section of the vessel 10 is approximately 40 feet long and approximately 20 feet in diameter. The walls of the vessel 10 may be made of various suitable material such as carbon steel, low or high alloy steels, and the like. It is at present preferred to form these walls of carbon steel. The wall thicknesses except for the intermediate head 13 which is about 2 inches thick, are about ¾ of an inch. In this installation for extreme temperature service, the entire inside surface of the vessel 11 and all of the inside surface of the vessel 12, except that defined by the head 13 are covered by a depth of insulation 14 of suitable material such as a castable, high temperature concrete of a thickness in the order of 4 inches. The vessel 10 is supported on a skirt 15 which is located on conventional foundations 16. When the vessel 10 is used as a catalytic reactor-regenerator, the internal flow temperatures in the various parts thereof will vary considerably; however, they will averagely be about as follows: the upper end of the vessel 11 will be at about 1100° F., while the lower end of the vessel 12 will be at about 950° F. The metal temperature of the walls 17 and 18 of the vessel 11 and the vessel 12 respectively, adjacent the intermediate head 13 and of the intermediate head 13 under these conditions will be about 1000° F. while the remainder of the vessels will be at about 350° F.

At the region where the walls 17 and 18 and the intermediate head 13 are interconnected to form a single structure while separating the space of vessel 10 into vessels 11 and 12, the walls 17 and 18 are of cylindrical section and the wall 17 below said region becomes approximately conical. The intermediate head 13 is generally hemi-spherical although it may be semi-ellipsoidal, or dished or conical as is common in the art. All of these sections are generated by the rotation of appropriately shaped boundary lines about a common axis.

The walls 17 and 18 and the intermediate head 13 are interconnected through a transition piece 19 which as shown, is annular and approximates an inverted Y-shaped section. The body portion 20 of the transition piece 19 is of sufficient size to withstand the full predicted pressure and temperature conditions to which it is subjected in service and furthermore can be designed in detail to provide a specified fatigue life as related to cyclic pressure and/or thermal effects in particular temperature transients and/or gradients. With the wall thicknesses and vessel sizes above stated, the thickness of the body section 20 is about 5 inches. A body section 20 of this thickness is more than sufficient to provide an ample unrestricted flow path for passage of heat from one to the other of the elements 13, 17 and 18 joined thereby. The transition piece 19 includes three legs 21, 22 and 23. These legs also are of a thickness and contour to successfully withstand all stress magnitude and distribution to which they are subjected due to pressure and thermal effects and by providing ample heat paths to minimize temperature gradients and attendant thermal stresses. The legs 22 and 23 may be of the same thickness as walls 17 and 18 or they may be of a materially greater thickness as for instance 2 inches and stepped down to ¾ of an inch either directly or through intermediate cylindrical pieces or rings 25 and 26. An intermediate cylindrical piece or ring 27 may likewise be employed between the head 13 and the leg 21. Since in the chosen example, the head 13 is 2 inches thick, no reduction from leg 21 to head 13 is required, it is generally preferred to employ the intermediate pieces 25, 26 and 27 since they make it possible to produce a stronger structure of higher quality and facilitate the shop fitup and field assembly of the intermediate section. The intermediate pieces 25, 26 and 27 are united to their respective walls 17 and 18, and head 13 by electric arc deposited conventional butt welds 28, 29 and 30.

The transition piece 19 may be formed as shown by any convenient metal shaping operation as by forging, rolling, machining, etc. The legs 21, 22 and 23 may be of any convenient length suitable for the metal thickness; with the vessel dimensions above stated, legs 22 and 23 of about 4 inches long and leg 21 of about 8 inches long are satisfactory. The space between the legs 21 and 22 forms a crotch construction which is about 1 inch wide. The upper portion of this crotch is formed as a semi-circular groove 31 to provide a favorable stress flow pattern and is finished to the extent required to eliminate any surface imperfections which may act as crack forming notches or stress raisers in the use of the vessel. The groove 31 is sufficiently removed from the end of the leg 22 so that when the weld 36 is deposited uniting the leg 22 to the intermediate piece 26, the condition of the groove 31 and the metal adjacent thereto is not derogated. The weld 36 can be deposited from one side only. However, after such deposition, completely satisfactory radiographic examination thereof may be made as the crotch construction permits the placing of the sensitized film in a suitable holder directly beneath the weld 36. The legs 21 and 23 are united to their respective intermediate pieces 27 and 25 by the butt welds 33 and 34. The latter welds are conventional butt welds and may be deposited by any preferred welding procedure. When it is desired to avoid the development of sharp temperature gradients and the stresses resulting therefrom, in the region of the transition piece 19, the outer surface of the vessel 10 may be covered with insulation 35 as shown in Fig. 2. The insulation 35 may be of uniform thickness or may be graded as indicated.

In the fabrication of the vessel 10 the transition piece 19 and head 13 are fabricated as a shop operation. The intermediate pieces 25, 26 and 27 and the head 13 are also preferably shaped, fitted, and welded to the intermediate piece 19 as a shop operation. The metal shaping operations required in the making of the piece 19 and the head 13 make field fabrication thereof a practical impossibility; whereas the shop deposition of the welds 30, 36, 33 and 34 makes possible quality standards not generally attainable in field operations and the production of a critical assembly of highest strength and quality. The transition piece 19 and the head 13 are formed to the required sizes and shapes in any preferred manner. Thus, the head 13 may be spun and pressed and the transition piece 19 forged, rolled, etc. After formation, the end of the head 13 and each of the legs 21, 22 and 23 are chamfered or otherwise shaped to provide the respective halves of the weld grooves required for the deposition of the welds 30, 36, 33 and 34. The intermediate pieces 25, 26 and 27 may be formed from plate by convenient rolling and/or pressing operations and closed into rings by appropriate longitudinal welds.

After the transition piece 19, the head 13, and the intermediate pieces 25, 26 and 27 have been formed and prepared as indicated, the intermediate piece 27 has its appropriate edge brought into abutting relation with the edge of the head 13. The weld 30 is then deposited by any preferred conventional electric arc welding procedure. The weld 30 is weldable from both sides and can be examined, back chipped, repaired, etc., as the welding progresses. There is nothing to interfere with the full X-ray examination of this weld. The assembly thus formed is brought into abutting relation with the shaped edge of the leg 21 so that the butt weld 33 may be deposited. Again this weld can be welded from both sides without any difficulty and may be deposited by any preferred welding procedure. Radiographic examination of this weld during any stage of its deposition is conveniently and effectively possible. The ring 25 is then brought into abutting relation with the shaped edge of the leg 23 and the weld 34 deposited. The weld 34 is a conventional butt weld and is accessible for welding, cleaning, chipping, examination, etc., from both sides. It too may be deposited by any preferred electric arc welding procedure. The ring 26 is then positioned in abutment with the shaped edge of the leg 22. It is to be noted that the weld 36 can be deposited from the outside only and is not accessible for welding, chipping, cleaning, etc., from the other side. In order to obtain a weld whose quality and strength is predictable and equal to that of the welds 30, 33 and 34, a special welding procedure is employed which is characterized in the production of a bead whose root side completely penetrates both edges and provides a smooth surface and blends into the adjacent parent metal without undercutting and is devoid of all oxidation and defect. It is at present preferred for this purpose to employ the welding procedure disclosed in the patent application of Charles Diehl, Serial No. 254,427, now Patent No. 2,747,065, and assigned to the assignor of the present application.

In carrying out the welding procedure of said Diehl application, the edges of the leg 22 and the intermediate piece 26 are shaped to form an appropriate welding groove whose bottom is defined by welding lips of a thickness not in excess of 1/8 of an inch. A welding lip of a thickness of 1/32 of an inch is at present preferred. After the edges of the leg 22 and the intermediate piece 26 are juxtaposed, they are aligned as accurately as conveniently possible and then tack welded at spaced points to maintain the alignment and the closeness of their juxtaposed position. A ring member of deformable material is then positioned within the crotch so as to form a closed chamber beneath the joint to be welded. The deformable and disposable ring member includes a connection through which gas may be admitted and one or more connections through which a controlled amount of gas may be bled out of the chamber. A noble gas such as helium or argon, but preferably helium, is supplied to the chamber at a controlled pressure which may range from .0003 p.s.i.g. to .08 p.s.i.g. A gas pressure of about .03 p.s.i.g. is at present preferred. In the formation of the root bead, the lips are fused by heat supplied from a highly concentrated source which is quiet and does not materially upset the metal of the molten metal pool. The arc struck from the end of a non-consumable electrode (tungsten electrode) which is shielded by a noble gas is preferred as the heat source. Filler metal may be supplied from a suitable rod manipulated in the usual manner. A convenient apparatus for supplying the welding heat under conditions that make possible sufficiently narrow root beads with complete penetration at the edges thereof and desired root surfaces and completely satisfactory root condition is the well known "heliarc" welding apparatus. Such apparatus is available in various capacities. The 120 ampere rated "heliarc" apparatus now available is of sufficient capacity for the purposes of this invention. This "heliarc" apparatus includes a gas cooled tungsten electrode, electric arc torch. The gas employed is helium or argon, but preferably helium, said gas after circulating through the torch exits about the non-consumable electrode and serves to provide a protective atmosphere thereabout as well as about and over the weld metal during deposition and solidification thereof. It is also possible to secure results comparable to those obtained by the procedure of the Diehl application identified, by using a modified procedure. In the modified procedure a thin shaped metallic insert is interposed between narrow lips, as above defined, and fused into the weld, otherwise the procedure is substantially identical with the Diehl procedure. As in the Diehl procedure, a non-consumable inert gas shielded high intensity arc is also employed.

When the root head is completed, it may be examined either by magnetic powder or radiographic examination in the conventional manner. The crotch is such that a sensitized film may be easily placed directly beneath the root bead of this weld, and a radiograph made directly and without interference. Any chipping or repair may be carried out to assure the production of a substantially perfect root bead. The remainder of the weld 36 may be completed in any preferred conventional way by depositing further beads and examining, repairing, cleaning, etc., as the weld progresses to the end that the weld 36 ultimately produced may be as near perfect as can be and the equal of a weld produced by welding from both sides with any preferred welding technique. The assembly thus produced is transported to the field.

At the site of use of the vessel 10, the foundation 16 is prepared in the conventional manner and the skirt 15 fabricated and positioned thereon. After this is done, the vessel 11 is assembled in any preferred manner, up to the edge of the wall 17 that is to be united to the intermediate piece 26. At this time the preformed shop assembly is positioned on the vessel 11 with the edge of the intermediate piece 26 abutting on and aligned with the upper edge of the wall 17, said upper edge having been properly shaped to form the welding groove in which the butt weld 29 is to be deposited. The weld 29 is deposited, inspected, repaired, etc., in any convenient manner as it is accessible from both sides for conventional welding. The wall 18 is then positioned on the intermediate piece 25 with the respective edges in alignment and the weld 28 deposited. This weld too is a conventional butt weld, is accessible from both sides, and may be deposited in any preferred conventional manner. The remainder of the vessel 12 is then fabricated in the conventional manner to complete the vessel 10. The insulation 14 is applied to the internal surfaces of the vessels 11 and 12 as heretofore indicated. If desired, the insulatiton 35 is then applied.

In the foregoing description specific size and configuration of the elements of the apparatus to which the invention is applied are set forth, it is to be noted that this is done merely by way of example and is not to be considered a limitation on the scope of the invention. Since many changes may be made without departing from the scope of the invention herein involved, it is intended that all matter contained in the above description or shown in the accompanying drawings shall be interpreted as illustrative and not as limitative.

I claim:

1. A transition piece for interconnecting three wall providing elements of a pressure vessel, all of said elements defined by surfaces of revolution generated about a common axis, which comprises, an annular member including three annular legs extending therefrom, two of said legs juxtaposed to provide a crotch formation therebetween, one of said juxtaposed legs longer than the other whereby the longer of said juxtaposed legs may be welded to its respective wall defining element from both sides thereof and the other of said juxtaposed legs can be welded from one side only, said juxtaposed legs being sufficiently long to prevent deleterious effects on the crotch end and the metal defining the crotch end during the deposition of the welds uniting said juxtaposed legs to their respective vessel elements.

2. A transition piece for interconnecting three wall providing elements of a pressure vessel, all of which elements are defined by surfaces of revolution generated about a common axis, which comprises a ring member of a thickness at least equal to the combined thicknesses of two of the elements to be interconnected, a cylindrical leg section extending from said ring in the direction of each of the respective elements and conformably shaped thereto, a pair of said leg sections juxtaposed to provide an annular crotch formation therebetween, said crotch formation having its end defined by a circular groove of smooth contour, said pair of leg sections extending sufficiently from said crotch end to prevent deleterious effects on said crotch end and the metal defining it during the welding on said sections to their respective elements, the one leg of said pair of legs longer than the other to permit welding of said longer leg to its respective element from both sides.

3. A pressure vessel including two opposed closed ended external wall defining sections, a transition member having three annular sections extending therefrom, two of said annular sections in opposed relation and each integrally connected to a respective external wall defining section to complete the external wall of said vessel, an intermediate head connected to the other of said annular sections and subdividing the internal space of said vessel into a pair of separated pressure chambers, weld metal uniting said legs to their respective wall defining sections and said intermediate head, two of said annular sections being juxtaposed to define a crotch formation therebetween, said crotch formation terminating in an annular groove of semicircular cross sections and of a width in the order of the thickness of said external wall defining sections, the external annular section of said crotch forming annular sections extending beyond the other to permit deposition of the connecting weld metal of said extending section from both sides thereof, the connecting weld metal of said extending section having a face bead at each side thereof.

References Cited in the file of this patent
UNITED STATES PATENTS 801,564 Allen _____ Oct. 10, 1905

FOREIGN PATENTS 172,469 Switzerland _____ Jan. 2, 1935